United States Patent [19]

Choca

[11] 4,066,572

[45] Jan. 3, 1978

[54] PHOSPHA-ALUMINA GEL AND METHOD OF PREPARATION

[75] Inventor: Monica E. Choca, Chicago, Ill.

[73] Assignee: Nalco Chemical Company, Oak Brook, Ill.

[21] Appl. No.: 731,128

[22] Filed: Oct. 12, 1976

[51] Int. Cl.$^2$ ............................................... B01J 27/14
[52] U.S. Cl. ..................................... 252/437; 252/435
[58] Field of Search ................................ 252/435, 437

[56] References Cited

U.S. PATENT DOCUMENTS

| | | | |
|---|---|---|---|
| 2,938,874 | 5/1960 | Rosinski | 252/437 |
| 3,271,299 | 9/1966 | Kearby | 252/437 X |
| 3,342,750 | 9/1967 | Kearby | 252/437 |
| 3,664,968 | 5/1972 | Eden | 252/437 |
| 3,904,550 | 9/1975 | Pine | 252/437 |
| 3,969,273 | 7/1976 | Brown et al. | 252/435 |
| 3,974,233 | 8/1976 | Lawrenson | 252/437 X |

*Primary Examiner*—J. Poer
*Assistant Examiner*—William G. Wright
*Attorney, Agent, or Firm*—Richard L. Johnston

[57] ABSTRACT

A novel phospha-alumina gel having a large average pore diameter and a characteristic pore volume distribution is prepared by co-precipitation of aluminum and phosphorus compounds. The gel is then dried, formed and calcined to give a material having a large average pore diameter of at least 100 A and a characteristic pore volume distribution with a minimum number of small pores, such that less than 30% of the total pore volume is in pores smaller than 100 A in diameter. Such material is especially useful as a catalyst or as a catalyst support.

15 Claims, No Drawings

PHOSPHA-ALUMINA GEL AND METHOD OF PREPARATION

BACKGROUND

U.S. Pat. Nos. 3,271,299 and 3,342,750 describe methods for producing colloidal hydrogels of aluminum phosphate which are employed as catalyst supports.

U.S. Pat. No. 3,904,550 discloses a method of precipitating aluminum phosphates from aluminum alkoxides with a phosphorus containing acid to give relatively high surface area supports.

The prior art, however, does not suggest or teach the preparation of a phospha-alumina gel, wherein such gel, when formed and calcined, (a) has a large average pore diameter, (in excess of 100 A) as determined by nitrogen adsorption and mercury intrusion methods, (b) having a characteristic pore volume distribution with a minimum number of small pores, such that less than 30% of the total pore volume is in pores smaller than 100 A in diameter, and (c) which can be prepared using inorganic aluminum salts and inorganic water soluble phosphates as starting materials.

OBJECTS

One of the objects of the present invention, therefore, is to produce novel phospha-alumina compositions which when formed and calcined have a large average pore diameter of at least 100 A and a characteristic pore volume distribution with a minimum number of small pores such that less than 30% of the total pore volume is in pores smaller than 100 A in diameter.

Another object of the invention is to produce compositions of the type described in which the average pore diameter can be controlled by the proportion of phosphorus.

Another object of the invention is to provide a new and improved phospha-alumina gel which is essentially amorphous to X-ray, and differential thermal analysis (DTA) or thermal gravimetric analysis (TGA) characterization.

A further object of the invention is to provide a new and improved method for producing phospha-alumina gels of the type described.

Another object of the invention is to produce new and useful catalysts and catalyst supports which can be employed in petroleum refining operations such as, for example, in combination with cobalt, nickel, tungsten and/or molybdenum for use as a catalyst for the desulfurization and denitrogenization and other hydrotreating processes of both light and heavy petroleum fractions or in combination with zeolitic materials for use in hydrocracking or catalytic cracking or combined with noble metals for use in the reforming of petroleum feed stocks.

BRIEF SUMMARY OF THE INVENTION

In accordance with the invention, inorganic aluminum salts and inorganic, water soluble phosphorus salts are co-precipitated to form a phospha-alumina gel which is essentially amorphous to X-ray and DTA or TGA characterization as described by Sata, Z. Anorg. Allg. Chem., 391, 167 (1972), and which, when dried and calcined, has the following properties, where pore volume distributions are determined by nitrogen adsorption and mercury intrusion:

a. large average pore diameter greater than 100 A, and b. minimal small pores, less than 30% of the total pore volume being in pores smaller than 100 A in diameter.

The size of the average pore diameter can be controlled by the proportion of phosphorus present during the preparation, the quantity of phosphorus preferably being within the range of 8% to 22% of the total dry weight, calculated as $P_2O_5$. However, it is in the spirit of the invention that larger proportions of phosphorus may be used. Such phospha-aluminas, when formed and calcined, are suitable for use as catalysts and catalyst supports, for example, as supports for various combinations of cobalt, nickel, tungsten and/or molybdenum for use in the desulfurization and denitrogenation and other hydrotreating processes of both light and heavy petroleum fractions or in combination with zeolitic materials for use in hydrocracking or catalytic cracking or combined with noble metals for use in the reforming of petroleum feed stock.

DETAILED DESCRIPTION OF THE INVENTION

The process of preparing compositions of the type described herein is carried out by mixing water soluble inorganic aluminum salts and water soluble inorganic salts of acids of phosphorus and co-precipitating a gel by adjusting the pH. The resultant gel, when dried, formed and calcined, has a major proportion of pores with an average pore diameter of at least 100 A and a minimal number of small pores, less than 30% of the total pore volume being in pores smaller than 100 A in diameter.

The average pore diameter is determined as the median pore diameter based on nitrogen adsorption pore volume. The average pore diameter increases with the amount of phosphorus introduced into the composition in its preparation. In addition, a drop in the total pore volume is observed with increasing amounts of phosphorus.

The physical properties of the formed calcined phospha-alumina are excellent. The phospha-aluminas prepared as described herein are particularly attractive because of their relatively narrow pore distribution at a large average pore diameter. Such distribution allows for maximum utilization of surface area without sacrificing such physical properties as crush and attrition.

Electron transmission microscope pictures of the freshly precipitated phospha-alumina gel show particles of about 0.4 to 1.9 microns in size. These particles are amorphous to electron diffraction.

For the purpose of this invention, pore volume distributions are given as determined by nitrogen adsorption and mercury intrusion. The pore volume distributions of the samples were determined using Micrometrics' commercial Mercury Penetration porosimeter (model 900/910 Series) and nitrogen porosimeter (Digisorb 2500). The operation of these instruments is described in detail in their manuals MIC P/N:90-42801 (Mercury) and 25-42805 (Nitrogen).

The invention will be further illustrated but is not limited by the following examples.

EXAMPLE I

Thirty gallons of water (120° F) were charged to a mixing tank with 17.6 pounds of $Al_2(SO_4)_3 \cdot 18H_2O$, 425 milliliters of concentrated $H_2SO_4$ and two pounds of $(NH_4)H_2PO_4$ (ammonium dihydrogen phosphate-monobasic) to give a clear solution.

In a separate container, a solution was made of nine gallons of water (110° F), 21.2 pounds of a water soluble aluminate having the composition 1.12 $Na_2O.Al_2O_3.3H_2O$, 1.2 pounds of sodium hydroxide and 75 milliliters of 50% gluconic acid. After stirring, a clear, brown solution resulted.

The resultant solution was titrated into the aluminum sulfate solution at a rate of about 760 milliliters per minute to an endpoint of pH 9.2. The precipitated phospha-alumina gel was filtered. The filter cake was slurried with water and spray dried. The spray dried powder was purified by the following method. The powder was slurried in water (110° F) to 6% solids (based on the weight of dry $Al_2O_3$-$P_2O_5$). The pH was adjusted to 9.6 using concentrated ammonium hydroxide. The slurry was filtered. The purification procedure was repeated twice more for a total of three purifications. The filter cake was dried at 150° F for three hours. The dried cake was mulled in a Simpson Muller.

The free moisture was adjusted to 64%. The mulled material was extruded through a 5/64 inch die. The pills were dried at 200° F and calcined at 1050° F. The physical properties of this formed calcined extrudate are given in Table I.

EXAMPLE II

This example serves as a comparison for Example I. A formed, calcined extrudate was prepared by the method of Example I except that the ammonium phosphate was left out in order to show the effect of the phosphate on the pore volume distribution. The physical properties of this formed, calcined extrudate are given in Table I.

EXAMPLE III

Fifty gallons of water (82° F) were charged to a mixing tank with 2.9 pounds of $NaH_2PO_4.H_2O$, 12 pounds of a water soluble aluminate having the composition 1.12 $Na_2O.Al_2O_3.3H_2O$ and 0.7 pound of sodium hydroxide.

In a separate container, a second solution was made of 26 pounds of $Al_2(SO_4)_3.18H_2O$ and 73 milliliters of concentrated $H_2SO_4$ in 22 gallons of water. The temperature of the resulting solution was 84° F.

The aluminum sulfate solution was titrated into the mixing tank at a rate of about 1.2 liters per minute to an endpoint of pH 5.3.

In a separate container, a third solution was made of nine pounds of a water soluble aluminate having the composition 1.12 $Na_2O.Al_2O_3.3H_2O$, 244 grams of sodium hydroxide and six gallons of water. The temperature of the resulting clear solution was 90° F. This third solution was titrated into the mixing tank at a rate of about 0.7 liter per minute to an endpoint of pH 9.2. The contents of the mixing tank were heated to 120° F and filtered. The filter cake was slurried with water and spray dried. The spray dried material was purified, dried, extruded and calcined in a manner similar to that of Example I. The physical properties of the formed, calcined extrudate are given in Table I.

EXAMPLE IV

This example serves as a comparison for Example III. Using the method of Example III, sodium carbonate was substituted for sodium phosphate in order to show the effect of the phosphate on the pore volume distribution. The preparation was as follows:

683 grams of $Na_2CO_3.H_2O$ were dissolved in a tank containing 28.5 gallons of water (75° F). Then 4,126 mls. of sodium aluminate were added and the solution was heated to 82° F. The sodium aluminate solution was prepared by dissolving 3,424 gms. of the soluble aluminate having the composition 1.12 $Na_2O.Al_2O_3.3H_2O$ (1,575 gms. $Al_2O_3$) and 198 gms. NaOH pellets in 2,660 mls. $H_2O$.

The above solution was titrated with 15.1 gallons of aluminum sulfate solution over a period of 57 minutes to pH 5.2. The aluminum sulfate solution was prepared by adding and dissolving in 14.4 gallons water (150° F), 116 mls. of concentrated $H_2SO_4$ and 9,080 gms. of $Al_2(SO_4)_3.18H_2O$ crystals (1,389 gms. $Al_2O_3$). The alumina batch slurry was then adjusted to a pH 9.2 with 7,684 mls. of diluted sodium aluminate solution which was prepared by dissolving in 7,424 mls. $H_2O$ (150° F), 96 gms. NaOH pellets and 1,600 gms. of the soluble aluminate having the composition 1.12 $Na_2O.Al_2O_3.3H_2O$ (736 gms. $Al_2O_3$). The precipitated hydrated alumina slurry was heated with steam to 112° F and was filtered. The filter cake was slurried in water and then spray dried. The recovered spray dried product was purified, dried, extruded and calcined. The physical properties of the formed, calcined extrudate are given in Table I.

EXAMPLE V

This example shows the use of the phospha-alumina base as a support for catalytic purposes. Improved desulfurization activity is shown for the phosphorus containing support over a support made by a similar method but without phosphorus.

Phospha-alumina was prepared according to the methods of Examples I and II. The purified powder was formed to give 1/16 inch diameter extrudate. The calcined extrudate was pore volume impregnated to give 14% $MoO_3$ and 3% CoO on the finished catalyst. The desulfurization activity of each catalyst was tested as follows. Sixty milliliters of catalyst were tested for desulfurization activity on heavy vacuum gas oil (gravity, API 20.0, boiling range 742°–1065° F.) containing 2.7% sulfur by weight. The standard run conditions were 650° F, 450 psig, 3 LHSV (vol. oil/hr/vol. catalyst) and 2500 standard cubic foot/bbl oil of $H_2$ (100%). The desulfurization activity is as follows:

| Catalyst | A | B |
|---|---|---|
| $P_2O_5$ | 8% | 0 |
| ABD (gm/ml) | .57 | .70 |
| % S in product | 1.05 | 1.22 |

EXAMPLE VI

This example shows the effect of increased phosphorus content. A preparation method similar to Example I was used except that the weight of the $(NH_4)H_2PO_4$ was doubled.

Thirty gallons of water (122° F) were charged to a mixing tank with 17.6 pounds of $Al_2(SO_4)_3.18H_2O$, 425 milliliters of concentrated $H_2SO_4$, 1077 milliliters of $H_3PO_4$(85%), 1030 milliliters of concentrated $NH_4OH$ to give a clear solution.

In a separate container, a solution was made of 9 gallons of water (about 110° F), 21.2 pounds of the aluminate composition 1.12 $Na_2O.Al_2O_3.3H_2O$, 1.2 pounds of sodium hydroxide and 75 milliliters of 50% gluconic acid. After stirring, a clear brown solution resulted.

The resultant solution was titrated into the aluminum sulfate solution at a rate of about one liter per minute until an endpoint of pH 9.6 was reached. The precipitated phospha-alumina gel was filtered. The filter cake was slurried with water and spray dried. The spray dried powder was purified by the following method. The powder was slurried in water (about 110° F) to 6% solids (based on the weight of dry $Al_2O_3$-$P_2O_5$). The pH was adjusted to 9.6 using concentrated ammonium hydroxide. The slurry was filtered. The purification procedure was repeated three more times for a total of four purifications. The filter cake was dried at 200° F for 3 hours to a 37% free moisture. The dried, purified powder was charged to a Simpson muller with 3.1 liters of water. The material was mulled 15 minutes after which a 57.5% free moisture was determined. The material was extruded, first through a ¼ inch die and then through a 5/64 inch die. The pills were dried at 200° F for three hours and calcined at 1050° F. for three hours. The physical properties of this formed, calcined extrudate are given in Table I. It should be observed that the increased phosphorus content coincides with an increase in the average pore diameter.

EXAMPLE VII

This example shows the effect of increasing the phosphorus content on the finished catalyst. A preparation method similar to Example I was used except that the weight of the $(NH_4)H_2PO_4$ was tripled.

Sixty gallons of water (120° F) were charged to a mixing tank with 35.2 pounds of $Al_2(SO_4)_3.18H_2O$, 850 milliliters of $H_2SO_4$, 3231 milliliters of $H_3PO_4$ and 3089 milliliters of $NH_4OH$. The temperature of the resulting clear solution was 126° F.

In a separate container, a solution was made of 9 gallons of water (about 110° F), 42.4 pounds of 1.12 $Na_2O.Al_2O_3.3H_2O$, 2.4 pounds of sodium hydroxide and 150 milliliters of 50% gluconic acid. After stirring, a clear brown solution resulted.

The resultant solution was titrated into the aluminum sulfate solution at a rate of about 1.2 liters per minute until an endpoint of pH 9.6 was reached. The precipitated phospha-alumina gel was filtered. The filter cake was slurried with water and spray dried. The spray dried powder was purified by the following method. The spray dried powder was slurried in water (about 110° F) to 6% solids (based on the weight of dry $Al_2O_3$-$P_2O_5$). The pH was adjusted to 9.8 using concentrated ammonium hydroxide. The slurry was filtered. The purification procedure was repeated again. The filtration rate was very slow. The filter cake was dried at 200° F for 3 hours to a 23.5% free moisture. 11 pounds of the dried, purified powder was charged to a Simpson muller with 1.8 liters of water. The material was mulled 15 minutes. An additional 1.85 liters of water were added to adjust the free moisture to 55%. The material was extruded, first through a ¼ inch die and then through a 5/64 inch die. The pills were dried at 200° F for three hours and calcined at 1050° F for 2 hours. The physical properties of this formed, calcined extrudate are given in Table I. It should be observed that the increasing phosphorus content shifts the average pore diameter to larger diameter.

TABLE I

| Example | I | II | III | IV | VI | VII |
| --- | --- | --- | --- | --- | --- | --- |
| Wt.% $Al_2O_3$ | 87 | 96 | 85 | 97 | 79 | 72 |
| Wt.% $P_2O_5$ | 9.7 | .09 | 11 | 0 | 17 | 22 |
| Wt.% $SO_4$ | 2.0 | 1.8 | 1.7 | .79 | 1.6 | 1.4 |
| Wt.% $Na_2O$ | .04 | .01 | .17 | .02 | .53 | 4.1 |
| Total PV (ml/gm)[1] | 1.071 | .5096 | .9669 | .6690 | .8406 | .5285 |
| Avg. PD (A)[2] | 250 | 90 | 350 | 125 | 420 | 528 |
| % PV<100A[3] | 22 | 55 | 17 | 60 | 12 | 6 |
| SA ($M^2$/g)[4] | 311 | 220 | 217 | 237 | 147 | 62 |

[1]Saturation pore volume by nitrogen.
[2]Average pore diameter based on nitrogen adsorption.
[3]Nitrogen adsorption pore volume as a percentage of the saturation pore volume.
[4]BET Nitrogen Adsorption Technique Surface Area.

In the foregoing table PV represents pore volume, PD represents pore diameter and SA represents surface area. Comparing Example I with Example II it will be seen that the phospha-alumina composition of Example I has an average pore diameter of 250 A whereas the average pore diameter in the alumina composition of Example II, which contains no significant amount of phosphorus, is 90 A. The percentage of pore volume in pores less than 100 A diameter is 22% in the composition of Example I, whereas it is 55% in the composition of Example II. Thus, in the composition of Example I, a minor proportion, less than 30%, of the total pore volume, exists in pores having a diameter less than 100 A. However, in the composition of Example II, a major proportion of the pore volume, more than twice the amount of Example I, exists in pores having a diameter less than 100 A.

Similarly, Example III, containing phosphorus, has an average pore diameter of 350 A, whereas Example IV, containing no phosphorus, has an average pore diameter of 125 A. Only a minor proportion, or 17%, of the pore volume of the composition of Example III is in pores having a diameter of less than 100 A, whereas, a major proportion, or 60%, of the pore volume of the composition of Example IV is in pores having a diameter less than 100 A. The percentage of pore volume, existing in pores having a small diameter, is even less in the compositions of Example VI and VII, which have greater phosphorus contents and the average pore diameters are substantially greater.

The phospha-alumina compositions described in the examples can be used as such as catalysts or as catalyst supports in various types of catalytic reactions and especially in catalytic reactions involving hydrodesulfurization, hydrogenation and denitrogenation of petroleum fractions. In practice a practical range of phosphorus contents in said phospha-alumina gels when dried, formed and calcined, is within the range of 5% to 30% by weight, calculated as $P_2O_5$.

A source of alumina is preferably a water soluble inorganic aluminum compound, preferred compounds being aluminum sulfate and sodium aluminate. However, the invention can be practiced with any water soluble inorganic aluminum compound which is capable of being precipitated as an alumina containing gel.

The source of the phosphorus compound can be any water soluble inorganic phosphorus compound which is capable of being precipitated as a gel in combination with alumina. In practice especially good results have been obtained with water soluble acidic phosphate salts including ammonium acid phosphate and sodium acid phosphate. Other salts, such as the diammonium phosphate and disodium phosphate, can be employed or phosphoric acid can be used, in which case it is preferably partially neutralized with either sodium hydroxide or ammonium hydroxide.

In carrying out the process of making the phospha-alumina gel as illustrated by the examples, it is preferable to prepare an aqueous solution containing both a source of aluminum and a source of phosphorus, and thereafter co-precipitating the phospha-alumina gel by adding an aqueous solution of a second water soluble aluminum containing salt.

Although it is optional, it is usually desirable to stabilize the sodium aluminate solution with an aldonic acid such as, for example, gluconic acid. The amounts used are subject to variation but are usually within the range of 0.5% to 6% by weight of the finished dried catalyst. Other aldonic acids and other hydroxy carboxylic acids can be employed but gluconic acid seems to be generally the most effective in stabilizing sodium aluminate.

In the examples the terms "concentrated sulfuric acid" and "concentrated ammonium hydroxide" have their conventional meanings in the art, concentrated sulfuric acid being a sulfuric acid containing approximately 96% $H_2SO_4$ and the remainder water, and concentrated ammonium hydroxide being ammonium hydroxide containing approximately 28% $NH_3$ and the remainder water.

Although the phospha-alumina gels of the present invention, when dried, formed and calcined, are useful as catalysts or catalyst supports, they are especially useful as catalyst supports for metals of Group VI of the Periodic table, for example, tungsten and molybdenum and their compounds, and metals of Group VIII of the Periodic Table, for example, iron, cobalt, nickel and copper and their compounds. These catalytically active metals can be applied to the phospha-alumina catalyst support in various ways as described, for example, in U.S. Pat. No. 3,232,887, where four different methods are described, namely, (1) the hot slurry method, (2) the pore volume method, (3), the hot slurry method without heat, and (4) the soaking technique. In the pore volume method, which is the method used to illustrate this phase of the invention in Example V, the phospha-alumina gel in the form of an extrudate or in any other form, is allowed to remain in contact with a solution of a compound of the catalytically active metal and the amount of said solution used is just sufficient to fill the pores of the phospha-alumina.

It will be recognized that various modifications may be made in the methods and procedures used in preparing the catalyst and in utilizing it, alone or in combination with catalytically active metals, without departing from the principles involved.

The invention is hereby claimed as follows:

1. A catalyst or catalyst support composition consisting essentially of a phospha-alumina which, when dried, formed and calcined has the following properties, where pore volume distributions are determined by nitrogen adsorption and mercury intrusion (a) large average pore diameter greater than 100 A, and (b) minimal small pores, less than 30% of the total pore volume being in pores smaller than 100 A in diameter, said phospha-alumina being obtained by preparing an acidic aqueous solution of at least one water soluble inorganic aluminum salt and at least one water soluble inorganic salt of an acid of phosphorus, adding an alkaline aqueous solution of a water soluble inorganic aluminate in sufficient amount to produce an alkaline pH and to form a coagulated precipitate, separating said precipitate from the residual solution and drying said precipitate in the form of discrete particles.

2. A phospha-alumina as claimed in claim 1 in the form of discrete particles having an average size within the range of 0.4 to 1.9 microns.

3. A catalyst or catalyst support as claimed in claim 1 in which the phosphorus content is within the range of 5% to 30% by weight calculated as $P_2O_5$.

4. A catalyst consisting essentially of a phospha-alumina as claimed in claim 1 which has been dried, formed and calcined and impregnated with a catalytically active metal.

5. A catalyst as claimed in claim 4 in which the catalytically active metal is one or more metals selected from a group consisting of metals of Group VI of the Periodic Table and metals of Group VIII of the Periodic Table.

6. A composition as claimed in claim 1 in which gluconic acid is added so as to be present during the precipitation of said precipitate in amounts within the range of about 0.5% to 6% by weight of the dried and calcined product.

7. A composition as claimed in claim 1 in which said precipitate is formed by mixing aluminum sulfate, sulfuric acid and ammonium dihydrogen phosphate in sufficient water to form an aqueous solution and adding an aqueous solution of a water soluble sodium aluminate.

8. A composition as claimed in claim 1 in which said precipitate is formed by mixing sodium dihydrogen phosphate and a water soluble sodium aluminate in sufficient water to form an aqueous solution, adding an aqueous solution of aluminum sulfate containing concentrated sulfuric acid to said first solution and thereafter adding an aqueous solution of a water soluble sodium aluminate to the resultant mixture in a sufficient amount to produce a coagulated co-precipitate.

9. A composition as claimed in claim 1 in which said phospha-alumina is co-precipitated by adding an aqueous solution of sodium aluminate containing gluconic acid in a stabilizing amount to an aqueous solution of aluminum sulfate and a phosphate prepared by mixing aluminum sulfate in water with sulfuric acid, phosphoric acid and ammonia.

10. A process of preparing a phospha-alumina in discrete particle form which comprises preparing an acidic aqueous solution of at least one water soluble inorganic aluminum salt and at least one water soluble inorganic salt of an acid of phosphorus, adding an alkaline aqueous solution of a water soluble inorganic aluminate in sufficient amount to produce an alkaline pH and to form a coagulated precipitate, separating said precipitate from the residual solution and drying said precipitate in the form of discrete particles, which when calcined have an average pore diameter of at least 100 A and a characteristic pore volume distribution with a minimal number of small pores such that less than 30% of the total pore volume is in pores smaller than 100A in diameter.

11. A process as claimed in claim 10 in which said precipitate is in the form of particles having an average size within the range of 0.4 to 1.9 microns.

12. A process as claimed in claim 10 in which said aluminum salt is selected from the group consisting of aluminum sulfate and sodium aluminate and said phosphorus salt is selected from the group consisting of ammonium orthophosphate and monosodium orthophosphate.

13. A process as claimed in claim 10 in which the pH is adjusted by adding sulfuric acid or ammonium hydroxide.

14. A process as claimed in claim 10 in which stabilizing amounts of gluconic acid are added to said aqueous aluminate solution.

15. A process as claimed in claim 10 in which an aqueous solution of aluminum sulfate is prepared to which is added sulfuric acid, an aqueous solution of sodium aluminate is separately prepared and the two solutions are mixed together.

* * * * *